(12) United States Patent
Glauser (10) Patent No.: US 7,735,379 B2
(45) Date of Patent: Jun. 15, 2010

(54) ELECTRODE FOR MAGNETIC FLOW SENSOR

(75) Inventor: Anthony Robert Glauser, Abingdon (GB)

(73) Assignee: Sentec Limited, Cambridge (GB)

( * ) Notice: Subject to any disclaimer, the term of this patent is extended or adjusted under 35 U.S.C. 154(b) by 497 days.

(21) Appl. No.: 11/571,596

(22) PCT Filed: Jun. 30, 2005

(86) PCT No.: PCT/EP2005/007055

§ 371 (c)(1),
(2), (4) Date: Jan. 3, 2007

(87) PCT Pub. No.: WO2006/002921

PCT Pub. Date: Jan. 12, 2006

(65) Prior Publication Data

US 2007/0227248 A1    Oct. 4, 2007

(30) Foreign Application Priority Data

Jul. 2, 2004   (GB) ................................ 0414875.5

(51) Int. Cl.
*G01F 1/58* (2006.01)
(52) U.S. Cl. .................................. 73/861.12
(58) Field of Classification Search ............... 73/861.12
See application file for complete search history.

(56) References Cited

U.S. PATENT DOCUMENTS

| 3,007,993 | A | | 11/1961 | Haring |
|---|---|---|---|---|
| 3,592,187 | A | | 7/1971 | Myron |
| 5,863,400 | A | * | 1/1999 | Drummond et al. ......... 205/778 |
| 6,626,048 | B1 | * | 9/2003 | Dam Es et al. ........... 73/861.13 |
| 6,634,238 | B2 | * | 10/2003 | Budmiger ................ 73/861.17 |
| 7,178,407 | B2 | * | 2/2007 | Kappertz et al. ......... 73/861.11 |
| 2007/0022823 | A1 | | 2/2007 | Knill et al. |

FOREIGN PATENT DOCUMENTS

DE      1235036      2/1967

* cited by examiner

*Primary Examiner*—Jewel Thompson
(74) *Attorney, Agent, or Firm*—Kelleher IP, PLLC; Sean Liam Kelleher (57) ABSTRACT

There is described a fluid flow sensor (10) for sensing a flow (F) of a fluid (120) through a region. The sensor (10) comprises a magnetic circuit (50, 60a, 60b) for applying a magnetic field (70) to the region, and electrodes (40a, 40b) for sensing a potential (V) generated in operation between the electrodes (40a, 40b) in response to the fluid (120) flowing through the magnetic field (70). Each electrode (40) includes a metal element (130; 300; 400; 500), a metal halide element (110; 310; 320; 410; 520), and an electrically conductive porous element (100; 330; 420; 530). The porous element (100; 330; 420; 530), hinders progressive loss of the metal halide element (110; 310, 320; 410; 520), to the flow (F) and provides an electrically conductive path between the flow (F) and the metal halide element (110; 310; 320; 410; 520), and thereby to the metal element (130; 300; 400; 500). Inclusion of the porous element (100; 330; 420; 530) provides the sensor (10) with increased operating longevity without compromising its measurement noise performance.

38 Claims, 7 Drawing Sheets

ELECTRODE FOR MAGNETIC FLOW SENSOR

FIELD OF THE INVENTION

The present invention relates to fluid flow sensors, for example to fluid flow sensors operable to measure flows of liquids such as water therethrough. Moreover, the present invention concerns sensing electrodes adapted for inclusion in such fluid flow sensors. Furthermore, the present invention also relates to methods of manufacturing such sensing electrodes.

BACKGROUND TO THE INVENTION

Flow transducers are known and function by exploiting various physical effects. Examples of magnetic flow transducers are described in a published international PCT patent application no. PCT/GB2004/001618 (WO 2004/090475). In this published PCT application, a magnetic transducer for measuring a flow of a fluid is elucidated. The transducer is illustrated schematically in FIG. 1 and indicated generally by 10 therein. The transducer 10 includes a tube 20 for guiding a flow F of a fluid. Moreover, the transducer 10 comprises a magnetic assembly indicated generally by 30 for applying a transverse magnetic field 70 in a region of the tube 20 in which the flow F occurs in operation. Furthermore, the transducer 10 includes two electrodes 40a, 40b at the region whereat the magnetic field 70 is applied, the electrodes 40a, 40b being coupled electrically to the fluid in the tube 20 and also connected to inputs of a signal processing unit 90.

Figure 1:
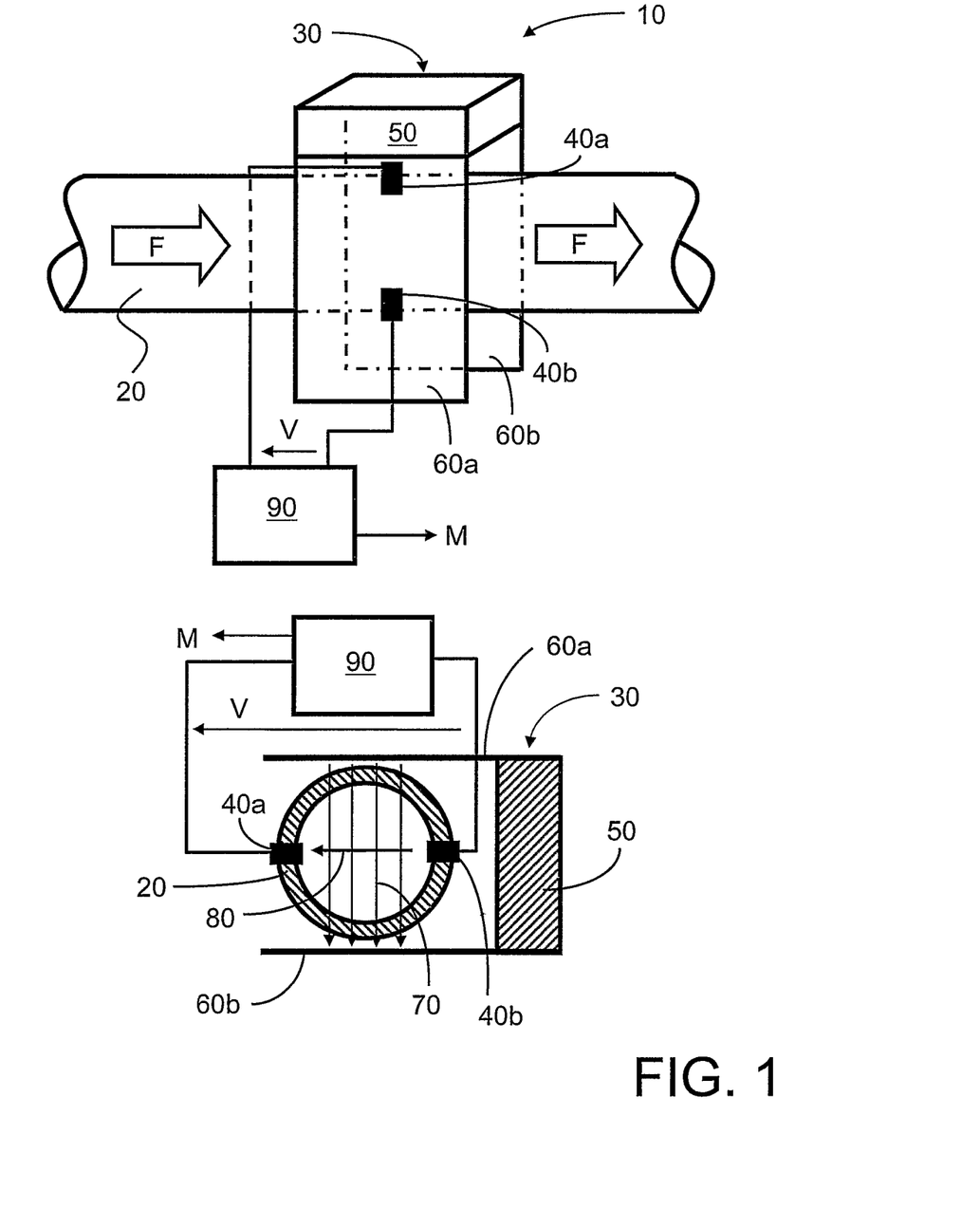
FIG. 1 is a schematic diagram of a known fluid flow transducer as described in an aforesaid published international PCT application.

The magnetic field 70 when applied is substantially parallel to a first axis orthogonal to a direction of the flow F through the tube 20. The magnetic assembly 30 includes a magnetic field generating component 50 magnetically coupled to pole pieces 60a, 60b so disposed so as to apply the transverse magnetic field 70 as illustrated. Optionally, the magnetic field generating component 50 employs a remnant field property of a magnetic material so as to circumvent a need to expend power in maintaining the magnetic field 70; in such operation, the transverse magnetic field conveniently has a magnitude in an order of milliTeslas.

The electrodes 40a, 40b are operable to sense a potential difference V denoted by an arrow 80 in a second axis, the second axis being substantially orthogonal to the first axis and to the direction of flow F. The potential difference V is generated in operation on account of the fluid flowing in the tube 20 including oppositely-charged free charge carriers, these free charge carriers being affected mutually differently by the magnetic field 70 to generate the potential difference V. The signal processing unit 90 is operable to process the potential difference V, taking into account the transverse field 70, to generate a measure M of the magnitude of the flow F. Integration of the measure M in respect of time provides an indication of a cumulative volume of fluid flowing through the transducer 10.

In order that the transducer 10 is capable of functioning reliably in operation, it is has been found important that the electrodes 40a, 40b are in stable electrical contact with the fluid in the tube 20 and that fluctuating electrochemical offsets do not arise at an interface presented between each of the electrodes 40a, 40b and the fluid. Whereas it has been hitherto conventional practice to employ graphite or corrosion-resistant metal alloy electrodes in related types of fluid flow meters, the aforementioned published PCT application discloses that electrodes comprising a combination of a metal element and a metal halide element operate in a more stable manner than such graphite or corrosion-resistant metal alloy electrodes; the metal halide element provides effectively a more stable electrical contact between the metal element and the fluid. Electrodes fabricated from silver and silver chloride are found to represent a considerable improvement to known approaches utilized in fluid flow transducers.

However, further improvements to those described in the aforesaid published PCT application are required to provide reliable operation over a period of many years when the transducer 10 is, for example, employed in domestic or industrial water flow metering situations. In these metering situations, it is found that an inconveniently large amount of metal halide needs to be included within the transducer 10 to provide reliable operation over the aforesaid period of many years on account of the metal halide element gradually dissolving into the fluid. This inconveniently large amount of metal halide required to provide extended longevity represents a technical problem. A first issue of the problem is that the metal halide element has a tendency to increase series resistance of the electrode 40a, 40b resistance which deleteriously affects noise performance of the transducer 10. Moreover, a second issue of the problem is that incorporation of more metal halide renders the transducer 10 potentially more expensive to manufacture, hence making the transducer 10 less commercially attractive in comparison to known alternative types of fluid flow transducers.

SUMMARY OF THE INVENTION

An object of the present invention is to provide a fluid flow sensor which is capable of providing an extended reliable operating lifetime without requiring inconveniently large amounts of electrode material to be included within the sensor to achieve such extended operating lifetime.

A further object of the invention is to provide an electrode for a fluid flow sensor which is capable of providing the sensor with an extended reliable operating lifetime.

A yet further object of the invention is to provide at least one method of manufacturing electrodes for fluid flow sensors, the electrodes being capable of providing such fluid flow sensors with extended reliable operating lifetime.

According to a first aspect of the present invention, there is provided a fluid flow sensor for sensing a flow of a fluid through a region, the sensor comprising a magnetic circuit for applying a magnetic field to at least a part of the region, and a configuration of electrodes for sensing a potential generated in operation between the electrodes in response to the fluid flowing through the magnetic field, characterized in that each of the electrodes includes a metal element, a metal halide element, and an at least partially electrically conductive porous element, said porous element being operable to at least partially hinder progressive loss of the metal halide element to the flow of the fluid, and to provide an electrically conductive path between the flow of the fluid and the metal halide element and thereby to the metal element.

The invention is of advantage in that inclusion of the porous element is capable of providing the sensor with increased operating longevity without compromising its measurement noise performance.

Optionally, in the sensor, the metal element includes silver and the metal halide element includes silver chloride. Silver and silver chloride are of benefit in that they are both considered to be generally non-toxic and also exhibit and a relatively low rate of dissolution into water. Moreover, both silver and silver chloride materials are widely available at affordable cost.

Optionally, in the sensor, the porous element includes at least one of: a metal wool, a metal foam, an at least partially electrically conductive porous polymer, at least partially electrically conductive porous graphite. For providing an advantage in the present invention, the porous element's at least partial electrical conductivity is susceptible to providing the electrodes with relatively low series resistance whilst hindering loss of the metal halide to the flow of the fluid.

Optionally, in the sensor, the porous element exhibits in operation a coefficient of electrical resistivity substantially at least an order of magnitude lower than that of the metal halide element. Arranging for the porous element to exhibit a coefficient of resistivity which is significantly less than that of the metal halide element enables the electrode to perform better than simpler electrodes comprising only metal elements and metal halide elements.

Optionally, for enabling the sensor to better cope with contamination, debris, bacterial growth and fungal growth, the porous element exhibits in operation progressive dissolution or abrasion thereof into the flow of the fluid, thereby assisting to render pores of the porous element providing porosity thereto accessible to the fluid. Such an implementation of the sensor is of benefit in that blocked pores of the porous element become opened as the porous element is abraded or dissolves into the flow of the fluid.

Optionally, in the sensor, the porous element and the metal halide element are substantially spatially coincident. For example, as elucidated later, the metal halide element and the porous element can be fabricated substantially as an integral component; for example, the porous element can be fabricated from particles of porous material and metal halide material sintered or otherwise mutually bonded together. Such an integral approach potential simplifies electrode construction and is susceptible to reducing manufacturing cost of the electrodes.

Optionally, in the sensor, the metal halide element is at least partially incorporated into the porous element. Such construction provides a gradual transition between the metal halide element and the porous element, thereby potentially improving electrical interfacing characteristics of the electrodes to the flow of the fluid.

Optionally, in the sensor, the porous element includes, or is pre-treated with, a wetting agent for rendering the porous element hydrophilic in respect of the fluid. Use of such a wetting agent is capable of rendering the electrode promptly stable in operation when first brought into operation in the sensor. Manufacturing costs and sensor calibration time can thereby potentially be reduced, thereby rendering the sensor easier to manufacture.

Optionally, in the sensor, the metal element, the metal halide element and the porous element are substantially mutually concentrically assembled together to form each corresponding electrode. Such a manner of assembly provides a compact form for the electrodes and is compatible with contemporary manufacturing processes.

Optionally, in the sensor, the metal element, the metal halide element and the porous element are implemented as elongate components, thereby rendering each electrode substantially linear in shape. Such a form for the electrodes is beneficial for continuous manufacturing processes wherein strips for providing the electrodes are continuously drawn from manufacturing tools.

Optionally, in the sensor, at least one of the metal halide element and the porous element are fabricated from particles bonded together so as to impart thereto porosity in respect of the fluid. Use of substantially randomly orientated particles to fabricate the electrodes is of benefit in that it is susceptible to providing for efficient manufacture as well as more stable electrical performance for the electrodes. More optionally, the particles are mutually bonded together by at least one of: sintering, bonding by mechanical compression, bonding by way of an added bonding agent. However, it will be appreciated that other approaches to mutually binding the particles together are feasible.

Optionally, in the sensor, the metal element is spatially disposed to at least partially enclose the porous element. Such a form of construction is potentially of benefit in that the metal element is generally mechanically stronger than the porous element, the metal element thereby providing physical protection to the porous element.

Optionally, in the sensor, the porous element can alternatively be arranged to at least partially enclose the metal element. Such a form of construction is of benefit in that a larger sensing area of the electrodes is potentially exposed to the flow of the fluid, thereby potentially reducing measurement noise.

Optionally, in the sensor, the porous element is subjected during its manufacture to deposition of metal halide therein by way of electroplating and/or anodic deposition. More optionally, such anodic deposition involves a deposition of metal halide into the porous element by way of a treatment employing a salt including a metal present in the metal element, and by way of a treatment employing an acid including a halide present in the metal halide element. Most optionally, the salt includes silver nitrate and the acid includes hydrochloric acid. Such a manner of introducing metal halide into the porous element is of benefit in that pores within the porous element are effectively filled at an interstitial scale of dimensions.

The sensor is capable of being adapted for use in various industrial and domestic applications. Optionally, the sensor is arranged to include a signal processing unit for receiving from the configuration of electrodes a signal corresponding to the potential generated between the electrodes in operation, the signal processing unit being operable to process the signal to generate at least one of a measure of the flow of the fluid, and a cumulative measure of the flow of the fluid, the sensor in combination with the signal processing unit thereby providing a fluid flow meter. More optionally, the sensor is adapted to operate as a water flow meter wherein the aforesaid fluid is water.

According to a second aspect of the invention, there is provided an electrode for providing an electrical contact to a fluid, the electrode comprising a metal element, characterized in that the electrode further comprises a metal halide element and an at least partially electrically conductive porous element, said porous element being operable to at least partially hinder progressive loss of the metal halide element to the fluid, and to provide an electrically conductive path between the fluid and the metal halide element and thereby to the metal element.

The electrode is of benefit in that inclusion of the porous element is capable of providing the electrode with increased operating longevity without compromising its measurement noise performance.

Optionally, in the electrode, the metal element includes silver, and the metal halide element includes silver chloride. Silver and silver chloride are of benefit in that they both are considered to be generally non-toxic and also exhibit a relatively low rate of dissolution into water. Moreover, both silver and silver chloride materials are widely available at affordable cost.

Optionally, in the electrode, the porous element includes at least one of: a metal wool, a metal foam, an at least partially electrically conductive porous polymer, at least partially electrically conductive porous graphite. For providing an advantage in the present invention, the porous element's at least partial electrical conductivity is susceptible to providing the electrodes with relatively low series resistance whilst hindering loss of the metal halide to the flow of the fluid.

Optionally, in the electrode, the porous element exhibits in operation a coefficient of electrical resistivity substantially at least an order of magnitude lower than that of the metal halide element. Arranging for the porous element to exhibit a coefficient of resistivity which is significantly less than that of the metal halide element enables the electrode to perform better than simpler electrodes comprising only metal elements and metal halide elements.

Optionally, in the electrode, the porous element exhibits in operation progressive dissolution or abrasion thereof into the fluid, thereby assisting to render pores of the porous element providing porosity thereto accessible to the fluid. Such an implementation of the sensor is of benefit in that blocked pores of the porous element become opened as the porous element is abraded or dissolves into the flow of the fluid.

Optionally, in the electrode, the porous element and the metal halide element are substantially spatially coincident. For example, as elucidated later, the metal halide element and the porous element can be fabricated substantially as an integral component; for example, the porous element can be fabricated from particles of porous material and metal halide material sintered or otherwise mutually bonded together. Such an integral approach potential simplifies electrode construction and is susceptible to reducing manufacturing cost of the electrodes.

Optionally, in the electrode, the porous element includes, or is pre-treated with, a wetting agent for rendering the porous element hydrophilic in respect of the fluid. Use of such a wetting agent is capable of rendering the electrode promptly stable in operation when first brought into operation in the aforementioned sensor. Manufacturing costs and sensor calibration time can thereby potentially be reduced, thereby rendering the aforesaid sensor easier to manufacture.

Optionally, in the electrode, the metal element, the metal halide element and the porous element are substantially mutually concentrically assembled together to form the electrode. Such a manner of assembly provides a compact form for the electrode and is compatible with contemporary manufacturing processes.

Optionally, in the electrode, the metal element, the metal halide element and the porous element are implemented as elongate components, thereby rendering the electrode substantially linear in shape. Such a form for the electrodes is beneficial for continuous manufacturing processes wherein strips for providing the electrodes are continuously drawn from manufacturing tools.

Optionally, in the electrode, at least one of the metal halide element and the porous element are fabricated from particles bonded together so as to impart thereto porosity in respect of the fluid. Use of substantially randomly orientated particles to fabricate the electrodes is of benefit in that it is susceptible to providing for efficient manufacture as well as more stable electrical performance for the electrodes. More optionally, the particles are mutually bonded together by at least one of: sintering, bonding by mechanical compression, bonding by way of an added bonding agent. However, it will be appreciated that other approaches to mutually binding the particles together are feasible.

Optionally, in the electrode, the metal element is spatially disposed to at least partially enclose the porous element. Such a form of construction is potentially of benefit in that the metal element is generally mechanically stronger than the porous element, the metal element thereby providing physical protection to the porous element.

Optionally, in the electrode, the porous element is alternatively arranged to at least partially enclose the metal element. Such a form of construction is of benefit in that a larger sensing area of the electrodes is potentially exposed to the flow of the fluid, thereby potentially reducing measurement noise.

Optionally, in the electrode, the porous element is subjected during its manufacture to deposition of metal halide therein by way of electroplating and/or anodic deposition. More optionally, such anodic deposition involves a deposition of metal halide into the porous element by way of a treatment employing a salt including a metal present in the metal element, and by way of a treatment employing an acid including a halide present in the metal halide element. Most optionally, the salt includes silver nitrate and the acid includes hydrochloric acid. Such a manner of introducing metal halide into the porous element is of benefit in that pores within the porous element are effectively filled at an interstitial scale of dimensions.

According to a third aspect of the present invention, there is provided a method of fabricating an electrode operable to enable an electrical contact to be made to a fluid, the method comprising steps of:
(a) providing a metal element;
(b) providing a metal halide element;
(c) providing an at least partially electrically conductive porous element which is porous to the fluid; and
(d) mutually assembling the metal element, the metal halide element and the porous element together such that the porous element is operable to hinder in use progressive loss of the metal halide element to the fluid, and to provide an electrically conductive path between the fluid and the metal halide element and thereby to the metal element.

Optionally, the method comprises further steps of:
(e) including silver in the metal element; and
(f) including silver chloride in the metal halide element.

Silver and silver chloride are of benefit in that both silver and silver chloride are considered to be generally non-toxic and also exhibit a relatively low rate of dissolution into water. Moreover, both silver and silver chloride materials are widely available at affordable cost.

Optionally, the method comprises a further step of:
(g) fabricating the porous element to include at least one: a metal wool, a metal foam, an at least partially electrically conductive porous polymer, at least partially electrically conductive porous graphite.

Optionally, the method comprises a step of fabricating the metal halide element and the porous element so that they are substantially spatially coincident when included into the electrode. For example, as elucidated later, the metal halide element and the porous element can be fabricated substantially as an integral component; for example, the porous element can be fabricated from particles of porous material and metal halide material sintered or otherwise mutually bonded together. Such an integral approach potential simplifies electrode construction and is susceptible to reducing manufacturing cost of the electrode.

Optionally, the method includes a further step of including within the porous element, or pre-treating the porous element with, a wetting agent for rendering the porous element hydrophilic to the fluid. Use of such a wetting agent is capable of rendering the electrode promptly stable in operation when first brought into operation in the aforementioned sensor. Manufacturing costs and sensor calibration time can thereby potentially be reduced, thereby rendering the aforesaid sensor easier to manufacture.

Optionally, the method comprises a further step of assembling the metal element, the metal halide element and the porous element together in a mutually concentric arrangement to form the electrode. Such a manner of assembly provides a compact form for the electrode and is compatible with contemporary manufacturing processes.

Optionally, the method comprises a further step of fabricating the metal element, the metal halide element and the porous element as elongate components for mutual assembly to fabricate the electrode, the electrode thereby being of substantially linear shape. Such a form for the electrodes is beneficial for continuous manufacturing processes wherein a strip for providing such electrodes is continuously drawn from manufacturing tools.

Optionally, the method includes a step of fabricating at least one of the metal halide element and the porous element from particles bonded together so as to thereto impart porosity in respect of the fluid. Use of substantially randomly orientated particles to fabricate the electrodes is of benefit in that it is susceptible to providing for efficient manufacture as well as more stable electrical performance for the electrodes. More optionally, the particles are mutually bonded together by at least one of: sintering, bonding by mechanical compression, bonding by way of an added bonding agent. However, it will be appreciated that other approaches to mutually binding the particles together are feasible.

Optionally, the method includes a step of electroplating or anodically depositing metal halide into the porous element by treating the porous element with a salt including a metal present in the metal element, and by treating the porous element with an acid including a halide present in the metal halide element. More optionally, such anodic deposition involves a deposition of metal halide into the porous element by way of a treatment employing a salt including a metal present in the metal element, and by way of a treatment employing an acid including a halide present in the metal halide element. Most optionally, the salt includes silver nitrate and the acid includes hydrochloric acid. Such a manner of introducing metal halide into the porous element is of benefit in that pores within the porous element are effectively filled at an interstitial scale of dimensions.

It will be appreciated that features of the invention are susceptible to being combined in any combination without departing from the scope of the invention as defined by the accompany claims.

DESCRIPTION OF THE DIAGRAMS

By way of example only, embodiments of the present invention will now be described with reference to the accompanying drawings wherein.

DESCRIPTION OF EMBODIMENTS OF THE INVENTION

Figure 2:
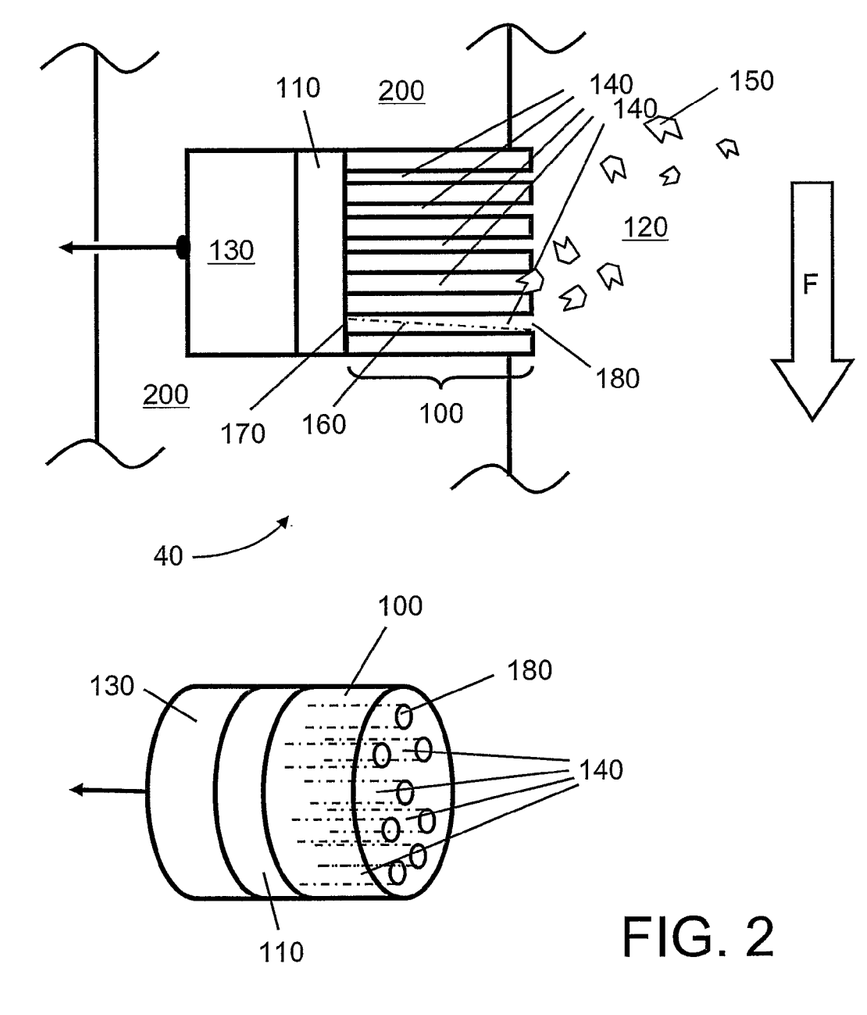
FIG. 2 is a schematic illustration of an electrode according to the present invention, the electrode incorporating a combination of metal, metal halide and at least partially electrically conductive porous elements.

In overview, the present invention is concerned with providing at least a partial solution to the aforementioned problem that a thicker layer of metal halide, for example in the electrodes 40a, 40b of the transducer 10, increases electrode series resistance and therefore sensor fluid flow measurement noise especially at measurement frequencies below 1 Hz, whereas a thinner layer of metal halide, for example in the aforesaid electrodes 40a, 40b of the transducer 10, is not capable of providing desired fluid flow sensor operating longevity due to progressive dissolution of the thinner layer of metal halide. The present invention provides at least a partial solution to this problem by employing, as illustrated in FIG. 2, an at least partially electrically conductive porous element 100 between, or spatially coincident with, a metal halide element 110 of a given electrode 40 and a fluid 120 whose flow is to be measured using the given electrode 40. A metal element 130 is included in the given electrode 40 in electrical contact with the metal halide element 110. Use of such a porous element 100 would to a person skilled in the art appear to be unsatisfactory on account of pores 140 present in the porous element 100 giving rise to its porosity being susceptible to being blocked by minute particles or debris 150 in the fluid 120 or, for example in a situation wherein the fluid 120 is water, by fungal or bacterial growth.

In practice, incorporation of the porous element 100 into the given electrode 40 is found to function reliably over extensive periods of time, for example potentially over ten years or more of continuous use. The pores 140 are capable of establishing a progressively decreasing concentration gradient 160 of metal halide therealong with a greatest concentration of metal halide at the metal halide element 110 in fluid communication with first ends 170 of the 140 pores remote from a bulk of the fluid 120, and with a lowest concentration of metal halide at second ends 180, namely pore openings, of the pores 140 exposed to the bulk of the fluid 120. Viscosity of the fluid 120 in combination with the relatively small size of the pores 140 reduces a rate of loss of metal halide from the metal halide element 110 via the pores 140 into the bulk of the fluid 120, thereby providing greater operating longevity to the given electrode 40. The at least partial electrical conductivity of the porous element 100 assists to provide a relatively low electrical series resistance characteristic to the given electrode 40, thereby reducing measurement noise, for example Johnson noise, in the measure M derived from the transducer 10 when implemented using the given electrode 40. If the porous element 100 were not conductive, the electrode 40 in FIG. 2 would present a higher series resistance to the signal processing unit 90 and would thereby result in increased Johnson noise in the measure M.

It will be appreciated that the pores 140 in the porous element 100 are not necessarily straight paths in practice but can be multiple complex interstitial routes between particles sintered or otherwise bonded together to form the porous element 100. When the element 100 is manufactured in such a manner, or alternatively cut from naturally-occurring bulk material, the pores 140 optionally have a nominal diameter in a range of 10 nm to 50 μm, more optionally in a range of 0.1 μm to 25 μm, and most optionally substantially in a range of 0.5 μm to 10 μm. Moreover, particles sintered or otherwise bonded together to form the porous material optionally have effective diameters in a range of 0.1 μm to 200 μm, more optionally in a range of 0.5 μm to 100 μm and most optionally in a range of 1 μm to 50 μm.

The porous element 100 is, for example, fabricated from an at least partially conductive material such as graphite which not only has a relatively low rate of dissolution into the fluid 120 but is also mechanically robust. Alternatively, the porous element 100 can be fabricated from an at least partially conductive polymer so formed so as to include the pores 140 therein. When graphite material is employed for fabricating the porous element 100, the graphite material can either be derived from suitably cut naturally-occurring solid graphite blocks, for example blocks of naturally occurring pyrolytic graphite, or derived from graphite particles which are bonded or otherwise mutually joined together to form the graphite material for manufacturing the porous element 100. Optionally, the porous element 100 includes integrally therein regions or particles of metal halide as also present in the metal halide region 110; when the porous element 100 is fabricated from particles sintered or otherwise mutually bonded together, for example by using elevated pressure in a hydraulic press, the particles optionally include a mixture of at least partially conductive particles, for example a mixture of graphite particles and metal halide particles. Alternatively, as will be elucidated in greater detail later, the porous element 100 can have subsequently formed or deposited therein metal halide material, for example by electroplating or by anodic deposition.

For example, in one example embodiment, the given electrode 40 depicted in FIG. 2 beneficially has its metal element 130 implemented using silver metal, its metal halide element 110 implemented using silver chloride, and its porous element 100 implemented as a combination of graphite particles and silver chloride particles, or simply graphite particles. In such an implementation in which the porous element 100 also includes metal halide particles, the metal halide element 110 can be rendered relatively thin or, for example, substantially absent so that the metal element 130 interfaces substantially directly to the porous element 100 including metal halide particles. The given electrode 40, when fabricating into the transducer 10 depicted in FIG. 1, is optionally molded or otherwise bonded into a wall 200 of the aforementioned flow tube 20 as represented in FIG. 2 to provide a fluid-tight seal thereto.

Optionally, the porous element 100 itself can be arranged to gradually dissolve or be abraded into the bulk fluid 120 so that pores 140 that become blocked at their second ends 180 are cleared of debris 150 so as to maintain access from the bulk fluid 120 via the pores 140 to the metal halide element 110 or, if desired, directly to the metal element 130.

Although the given electrode 40 depicted in FIG. 2 is illustrated in schematic form, the electrode 40 being beneficially employed in a transducer 10 as depicted in FIG. 1 for providing the electrodes 40a, 40b, it will be appreciated that the given electrode 40 can be implemented in a wide variety of manners in practice as will be described later.

The given electrode 40 in FIG. 2 corresponds to a galvanic electrode providing a benefit when employed in the transducer 10 of introducing relative less noise into the measure M output from the transducer 10, especially at relatively low frequencies in the order of 1 Hz or less, in comparison the transducer 10 employer basic galvanic metal/metal-halide electrodes as described in published international PCT application no. PCT/GB2004/001618, or conventional carbon or stainless-steel electrodes. A galvanic electrode is distinguished in that it permits in operation a flow of electrical current into or out of a fluid via a transfer of charge species through its surface, even at relatively low electrical potentials; such low electrical potentials are for example less than one volt with respect to the fluid. Such galvanic electrodes are to be contrasted with blocking electrodes which effectively only allow a capacitive displacement current to flow under comparable conditions.

As elucidated in the aforesaid published PCT application, a simple example of a galvanic electrode is a silver metal element coated with a thin permeable film of silver chloride, the electrode being immersed in operation in an ionically conductive electrolyte. Although such a simple galvanic electrode provides satisfactory performance in laboratory conditions, namely in non-hostile environments substantially devoid of debris and particles 150, the inventor has identified that improvements are possible to the simple galvanic electrode to improve its sensing characteristics. Limitations of the simple silver/silver chloride electrode include:

(i) a gradual loss of silver chloride by mechanical and chemical action when exposed to flowing liquid, such loss resulting in degraded electrode measurement stability when exposed to the liquid for prolonged periods, for example several weeks or months; and (ii) an increasing Johnson noise in the measure M as thickness of the silver chloride film is increased on the electrode at initial manufacture, such increasing noise being due to increased series resistance of the silver chloride layer.

As elucidated in the foregoing, point (ii) imposes an undesirable upper limit on an amount of silver chloride which may be usefully applied to the simple galvanic electrode at its initial manufacture. The present invention thus endeavors to provide an improved electrode for a fluid flow sensor, namely transducer, which has a relatively larger reservoir of metal halide, for example silver chloride, in such a way as to try to avoid degrading noise performance of the electrode. One approach to providing such an improved electrode is to embed a pellet of metal halide, for example silver chloride, in a cavity within a surface of the electrode such that at least a part of the electrode surface in operation is in electrical contact with a liquid via a relatively thin layer of metal halide, for example silver chloride. A further improved solution pursuant to the present invention is to include a porous, at least partially electrically-conductive element between the metal halide, for example silver chloride, and a fluid, for example a liquid, whose flow is to be measured; the porous element is operable to present at least one of an additional conductive area to the fluid, and to provide for a reduced rate of dissolution of metal halide into the fluid.

Figure 3:
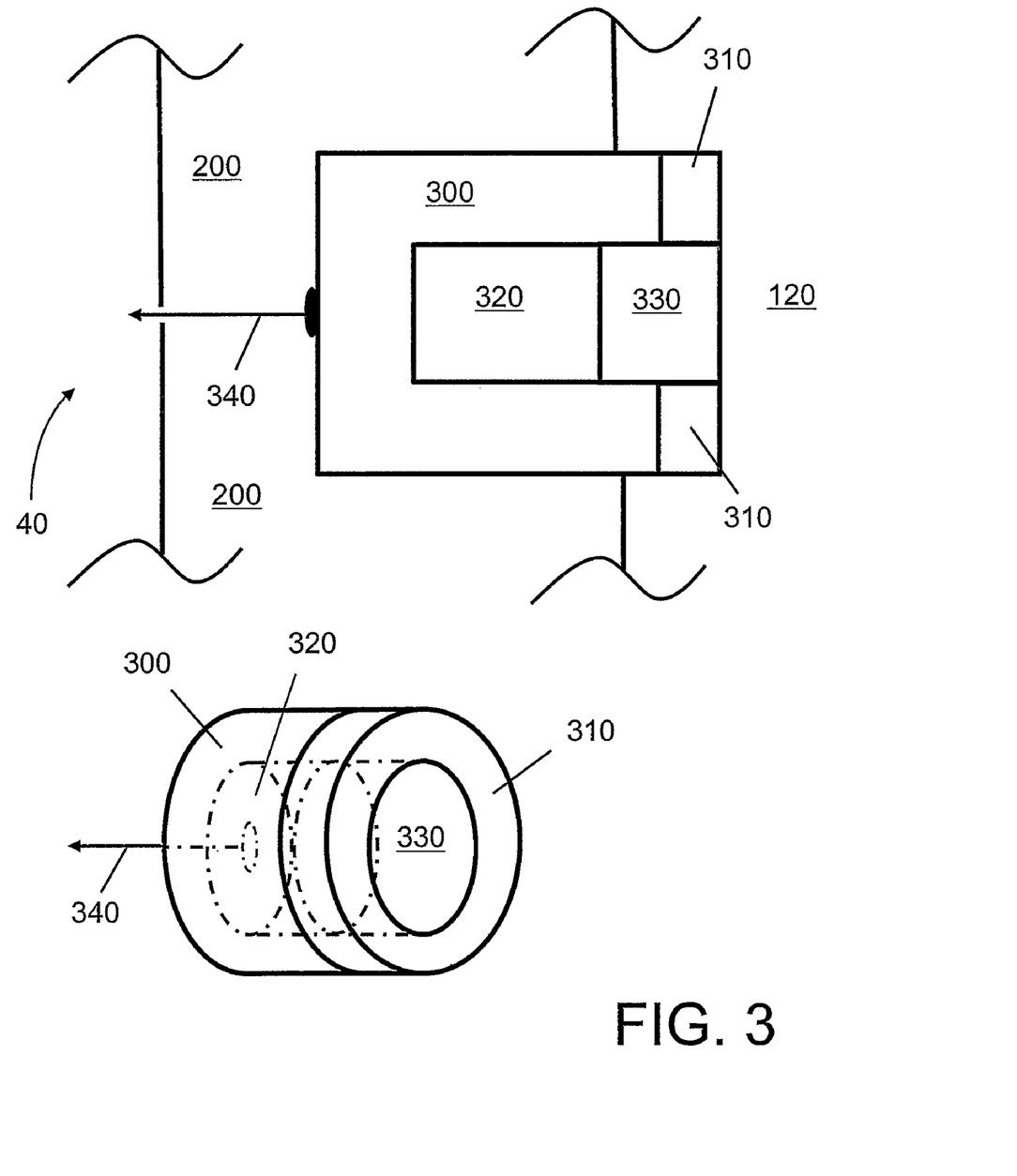
FIG. 3 is a schematic diagram of a practical implementation of the electrode illustrated in FIG. 2.

Referring to FIG. 3, a first practical embodiment of the given electrode 40 is shown. In FIG. 3, the given electrode 40 is illustrated in side cross-sectional view as well as perspective view. The electrode 40 comprises a metal shell 300, for example fabricated from silver, corresponding metal halide elements 310, 320, for example comprising silver chloride, and a porous element 330 fabricated from an at least partially electrically conductive porous material; as elucidated in the foregoing, the porous material can optionally include at least one of a metal foam, a metal wool and graphite, although other types of porous conductive materials may also be employed, for example an electrically conductive ceramic material. Graphite has a coefficient of resistance in a range of $3\times10^{-6}$ $\Omega$m to $60\times10^{-6}$ $\Omega$m. Moreover, pyrolytic graphite which has identifiable crystal planes exhibits a coefficient of resistance of $5\times10^{-6}$ $\Omega$m along its crystal planes and $5\times10^{-3}$ $\Omega$m normal to its planes. In comparison, silver metal has a coefficient of resistance of substantially $1.5\times10^{-8}$ $\Omega$m at room temperature. For the purpose of describing the present invention, the expression "at least partially conductive" is optionally to be construed to mean that the porous material has a bulk coefficient of resistance which is substantially at least an order of magnitude lower than that of the metal halide material when affected by the fluid 120 in use. More optionally, the expression "at least partially conductive" is to be construed to mean that the porous material has a bulk coefficient of resistance which is substantially at least two orders of magnitude lower than that of the metal halide material when affected by the fluid 120 in use. For example, silver chloride is substantially an insulator in dry form but provides conductivity when in combination with water.

Figure 4:
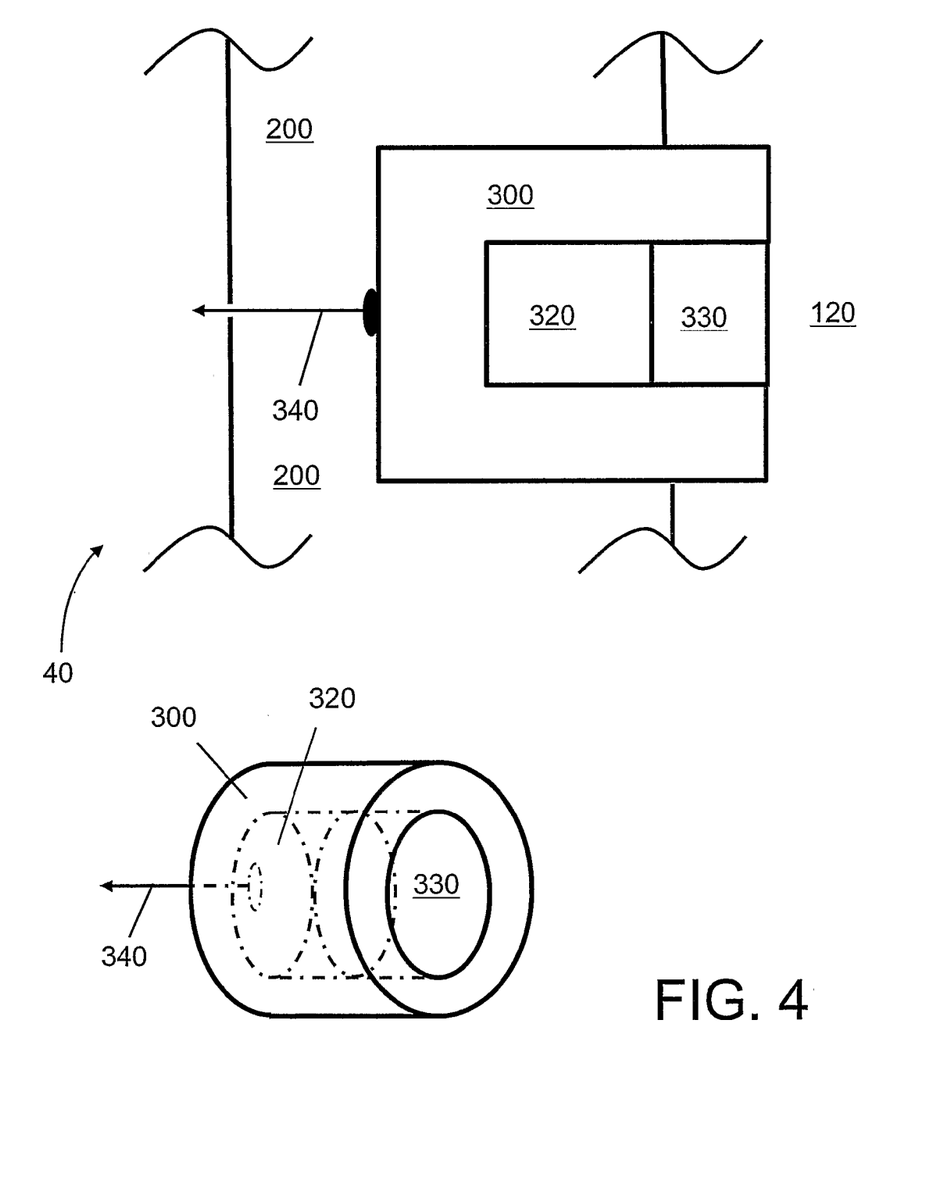
FIG. 4 is a schematic diagram of a simplified version of the electrode illustrated in FIG. 3.

The porous element 330 is exposed at its first face in operation to a bulk of the fluid 120 and at its second face to the metal halide element 320 comprising metal halide material. In FIG. 3, the porous element 330 is shown in electrical contact with both of the metal halide elements 310, 320 as well as directly with the metal shell 300. Optionally, the metal halide element 310 can be omitted as depicted in FIG. 4 in cross-sectional and perspective views. Conveniently, the element 320 is implemented as a pellet of metal halide material, for example silver chloride, the pellet being crimped into the metal shell 300 during manufacture. The electrode 40 depicted in FIG. 3, when incorporated into the transducer 10, is preferably molded or otherwise bonded into the wall 200 of the tube 20 with a seal being provided to the metal shell 300; in practice, the inventor has found that a fluid-tight seal cannot easily be made to the porous element 330 itself. Optionally, a first face provided by the porous element 330 to the fluid 120 is flush with an inside surface of the tube 20 so as to reduce local turbulence and hence reduce mechanical abrasion to the first face of the porous element 330. Moreover, the shell 300 is conveniently fabricated from flat metal sheet which is punched during manufacture to form it into a shell-like shape; however, other approaches to manufacturing the shell 300 such as machining from metal bar or casting are also feasible. The metal halide element 320 is conveniently mechanically retained within the shell 300 by at least one of mechanically crimping the shell 300 onto the element 320, and sparingly applying an adhesive or bonding agent to a part of an interface presented between the metal halide element 320 and an inside surface of the shell 300. Furthermore, the shell 300 is optionally electrically connected at its rear surface to a wire 340 molded or bonded into the wall 200 to provide a fluid-tight seal; the wire 340 is operable to couple, for example, the given electrode 40 in FIG. 3 to the signal processing unit 90 of the transducer 10 to provide an enhanced fluid flow transducer, namely fluid flow sensor, according to the present invention.

The porous element 330 provides the given electrode 40 depicted in FIGS. 3 and 4 with an essentially continuous conductive surface at higher signal frequencies, namely greater than 0.1 Hz, at which a capacitive component of an impedance presented by the electrode 40 to the fluid 120 is a dominant signal conduction path. Moreover, the given electrode 40 depicted in FIGS. 3 and 4 also permits in operation an exchange of ions between the metal halide element 320 and the fluid 120, as required for optimal low-frequency sensing performance, in which a resistive component of an impedance presented by the electrode 40 to the fluid 120 is a dominant signal conduction path. In other words, inclusion of the porous element 330 synergistically combines a beneficial high-frequency electrode performance on account of increase conductive electrode surface area effectively being presented to the fluid 120, and enhanced low-frequency performance due to the elements 310, 320 including metal halide material providing a stable galvanic electrical connection characteristic to the fluid 120.

A significant benefit of including the porous element 330 in the given electrode 40 of FIGS. 3 and 4 is that depletion of metal halide material, for example silver chloride, from the metal halide element 320 by mechanical abrasion and ionic diffusion is reduced. Debris or particles 150 in the fluid 120 will, in operation, tend to damage the porous element 330 instead of metal halide material included in the element 320. Whereas damage to the element 320 potentially degrades a low-frequency performance of the electrode 40, sensing performance degradation does not arise as a consequence of the porous element 330 being abraded. After prolonged use of the given electrode 40 as in FIGS. 3 and 4 employed in the transducer 10 illustrated in FIG. 1, for example over a electrode working lifetime of 20 years, gradual dissolution of the metal halide element 320 into the fluid 120 will occur. When the metal halide is silver chloride, trace amounts of silver chloride in the fluid 120 generally is not regarded to constitute any health risk; for example, silver chloride has been previously employed as an officially-approved food coloring additive devoid of any documented deleterious health effects. Such low health risk renders the given electrode 40 susceptible to be used in situations in which the flow of drinking water is to be monitored. The porous element 330 is thus of benefit in that it is operable to retard dispersion of metal halide ions from the element 320 into the fluid 120, thereby slowing dissolution of the element 320 into the fluid 120 and hence providing the given electrode 40 with enhanced operating longevity.

As elucidated in the foregoing, the inventor has appreciated that intergrowth or inclusion of metal halide material into the porous element 330 represents a further optional implementation of the given electrode 40. Such intergrowth or inclusion of metal halide material can be achieved by utilizing a mixture of metal halide particles and conductive porous material particles when fabricating the porous element 330 by sintering or similar bonding or compression processes to mutually binding the particles together. Alternatively, or additionally, the metal halide can be subsequently formed into the conductive porous material used to fabricate the porous element 330 by anodic treatment.

In such anodic treatment, the porous element 330 can, for example, be initially manufactured by machining porous graphite or by mutually binding graphite particles together to form a graphite mass. The graphite mass can then subsequently be exposed to a solution of a metal salt, for example a silver nitrate solution, that is permitted to infiltrate into pores 140 of the mass. Next, the mass exposed to the solution of the metal salt is subsequently exposed to an acid including a halide, for example hydrochloric acid. Reaction of the acid with the solution of the metal salt infiltrated into the pores 140 results in deposition of metal halide into the pores 140. Silver chloride can thereby be deposited in interstitial spaces between particles mutually bonded to fabricate the porous element 330 by first treating the graphite mass with silver nitrate solution followed by exposing the treated graphite mass to hydrochloric acid. It will also be appreciated, for example as an alternative, that electroplating techniques for causing ingrowth of metal halide material into pores 140 of the porous element 330 is also a feasible manufacturing approach.

Figure 5:
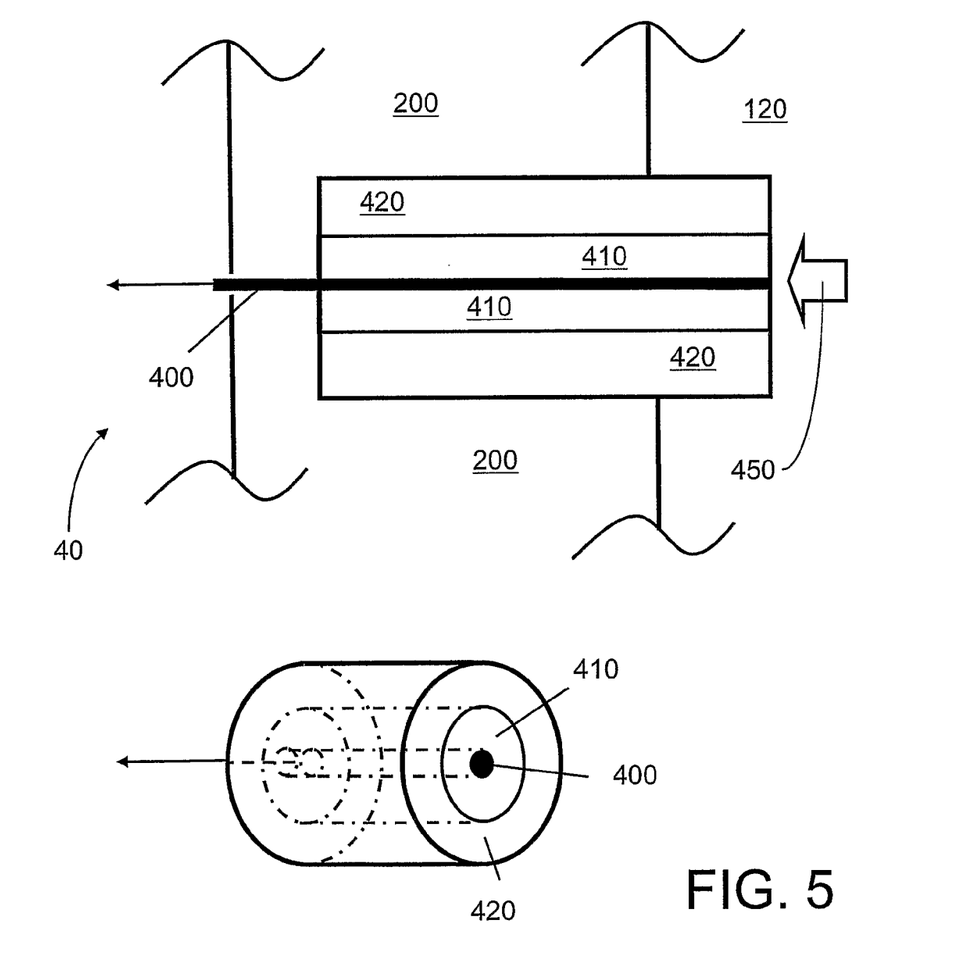
FIG. 5 is a schematic diagram of an alternative practical implementation of the electrode illustrated in FIG. 2.

In FIGS. 3 and 4, the shell 300 is shown to at least partially surround the porous element 330. It will be appreciated that other implementations of the given electrode 40 are feasible as depicted in FIG. 5 in cross-sectional and perspective views. In FIG. 5, the given electrode 40 is implemented with a central rod or wire 400 of metal, for example of silver metal, at least partially concentrically surrounded by a corresponding metal halide element 410, for example silver chloride, which, in turn, is at least partially concentrically surrounded by a porous element 420. The porous element 400 is optionally fabricated from similar materials to those employed to fabricate the aforementioned element 330 in FIGS. 3 and 4. It will be appreciated that mutually concentric assembly of the wire 400 and the elements 410, 420 is optional and that non-concentric assembly is also feasible. Optionally, silver halide material can be integrally incorporated into the porous element 420 so that the metal halide element 410 can be reduced in thickness or even omitted. In use, the given electrode 40 depicted in FIG. 4 can be mounted so that a peripheral outer surface of the porous element 420 primarily provides a principal conduction path for making electrical contact with the fluid 120. Alternatively, an end region of the electrode 40 of FIG. 5 in a direction denoted by an arrow 450 provides a principal conduction path for making electrical contact with the fluid 120; such a latter arrangement is of benefit in that the wire 400 as well as the elements 410, 420 can potentially contribute to making electrical contact with the fluid 120. Optionally, the electrode 40 depicted in FIG. 5 can be bonded or molded into the wall 200 of the tube 20 of the transducer 10 such that a fluid seal is provided against the central rod or wire 400 as shown. The electrode 40 depicted in FIG. 5 is potentially simpler to manufacture in that a need to crimp or otherwise bond the shell 300 to the elements 310, 320 can be circumvented.

In the foregoing, it will be appreciated that the porous elements 330, 420 are fabricated from one or more materials which are less electrochemically active than the metal and metal halide materials employed for the elements 310, 320, 410, for the shell 300 and for the wire or rod 400. When a silver/silver chloride combination is employed for the metal/metal halide, the porous elements 330, 420 beneficially do not include one or more of palladium, platinum or gold which have electrochemical potentials which can potentially interfere with operation of the given electrode 40, for example when fabricated to utilize a silver/silver chloride combination.

To reduce costs, the wire or rod 420, similarly the shell 300, can be fabricated from an inexpensive metal, for example copper, which is then subsequently plated with a desired metal, for example silver, on its exterior surface. By doing so, manufacturing cost of the electrode 40 as illustrated in FIGS. 4 to 5 can be potentially reduced. However, in such an implementation, it is desirable that the fluid 120 is not able to penetrate into an interface arising between the inexpensive metal and the desired metal in case corrosion occurs thereat.

FIGS. 3, 4 and 5 illustrate embodiments of the given electrode 40 implemented in substantially concentric arrangements. The inventor has also appreciated that alternative arrangements are feasible. For example, in cross-section and perspective views in FIG. 6, there is shown the electrode 40 implemented in a linear arrangement including an elongate metal shell 500 formed in a channel-type shape, for example into a "U"-shape channel, whose inner surface 510 at least is provided with a layer 520 of corresponding metal halide. For example, the metal shell 500 is optionally fabricated from silver and the layer 520 from silver chloride. Retained within the metal shell 500 is an elongate strip 530 of at least partially electrically conductive porous material, for example graphite, metal wool, metal foam or electrically conductive porous polymer or plastics material; the porous material includes pores 140 through which fluid 120 is capable of penetrating to make electrical contact to the layer 520 and thereby to the metal shell 500.

Figure 6:
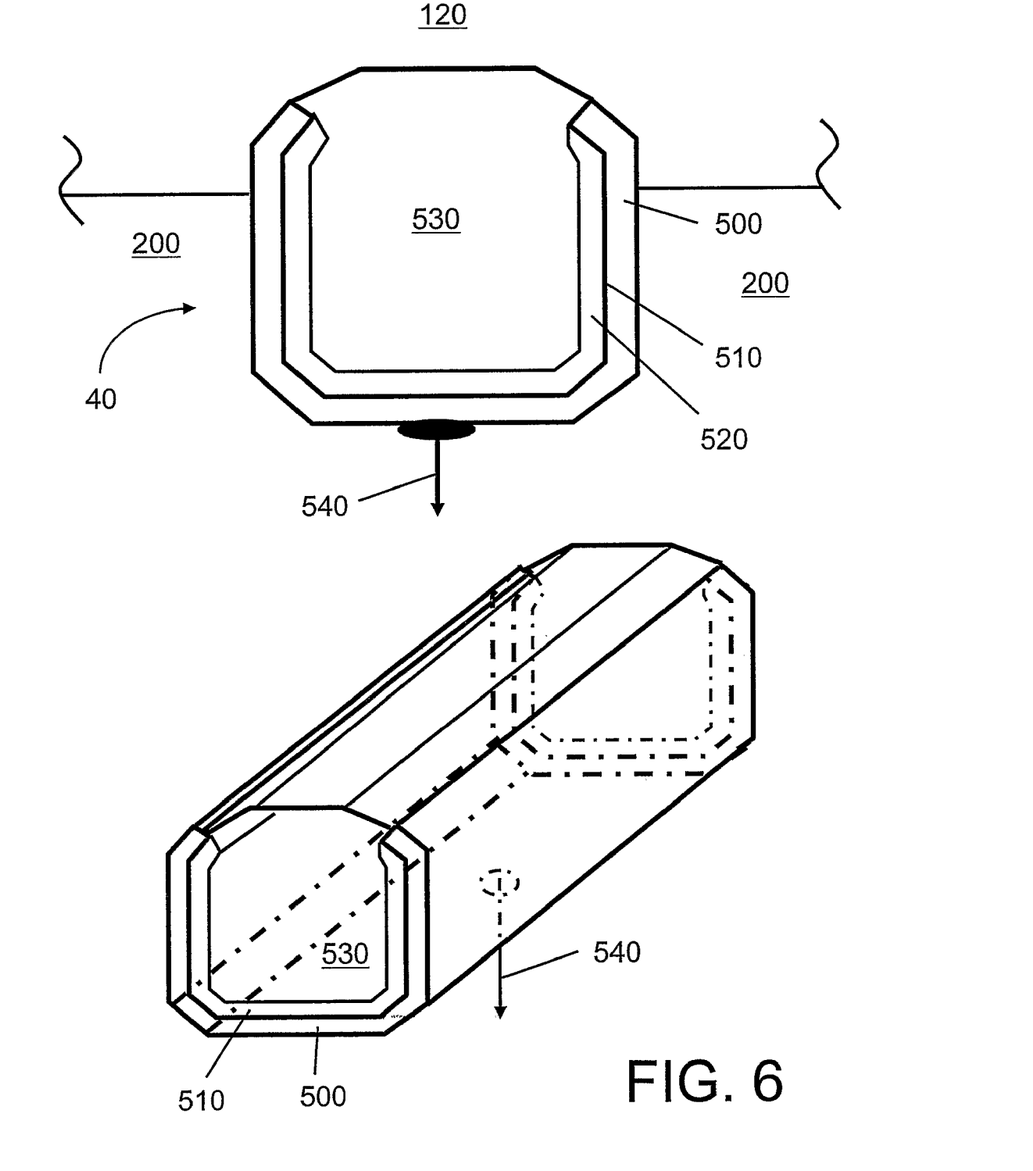
FIG. 6 is a schematic diagram of a further alternative elongate implementation of the electrode illustrated in FIG. 2.

The given electrode 40 as illustrated in FIG. 6 is of benefit in that it can be manufactured from an elongate strip comprising the shell 500 provided with its layer 520 and crimped onto the strip 530. This elongate strip 530 can be subsequently cut or sawn to form it into relatively shorter given electrodes 40 as depicted in FIG. 6 to which one or more wires 540 can be attached, for example by soldering, crimping or spot welding. When such given electrodes 40 are employed in the transducer 10, the tube 20 is beneficially fabricated, for example by way of extrusion molding techniques, to have a rectangular cross-section for receiving such elongate electrodes 40 as illustrated in FIG. 6. Optionally, given electrodes 40 of a form as depicted in FIG. 6 are mounted transversely to the flow F when incorporated into the transducer 10 depicted in FIG. 1.

An issue arising in practice when manufacturing transducers 10 as illustrated in FIG. 1 including electrodes 40a, 40b implemented according to the present invention, for example using given electrodes 40 including electrically conductive porous elements as depicted in one or more of FIGS. 2 to 6, is initial wetting of the electrodes 40a, 40b. The pores 140 potentially require a period of time to be appropriately filled with the fluid 120. When the fluid 120 is water, stable wetting of the pores 140 can initially take several hours before the measure M of the transducer 10 incorporating such given electrodes 40 including conductive porous elements becomes stable in relation to the flow F. The inventor has envisaged that the given electrodes 40 can be pre-treated with wetting agents, for example with one or more of an alcohol, a detergent or other wetting agent as commonly employed in semiconductor fabrication processes; the pores 140 are thereby rendered hydrophilic and therefore susceptible to being rapidly filled with the fluid 120 in operation. When the porous elements 100, 330, 420, 520 are manufactured from particles mutually bonded together, wetting agents can be introduced to the particles prior to them being mutually bonded together. Alternatively, for example when the porous elements 100, 330, 420, 520 are manufactured using a relative high temperature process, for example a sintering process using elevated temperatures in an order of 500° C., such a wetting agent can subsequently be introduced into the elements 100, 330, 420, 520 so that they stabilize rapidly, for example within minutes, when first brought into use in the transducer 10. Such introduction of the wetting agent can be conveniently implemented by way of vacuum impregnation or by high-pressure impregnation, or simply by prolonged exposure of the elements 100, 330, 420, 520 to wetting agents prior to initial use.

As elucidated in the foregoing, the given electrodes 40 according to the present invention including electrically conductive porous elements for improving their performance are susceptible to being employed within the transducer 10 illustrated in FIG. 1 for improving its measuring stability and increasing its operating lifetime. The transducer 10 is suitable for application as a water flow sensor, for example in domestic and industrial environments. The water flow sensor, in turn, is susceptible to being included in a water flow meter for measuring cumulative water flow, for example for water-consumption billing purposes. When the electrodes 40 according to the present invention are employed in the transducer 10, they provide the transducer 10 with an improved noise characteristic as depicted in FIG. 7.

Figure 7:
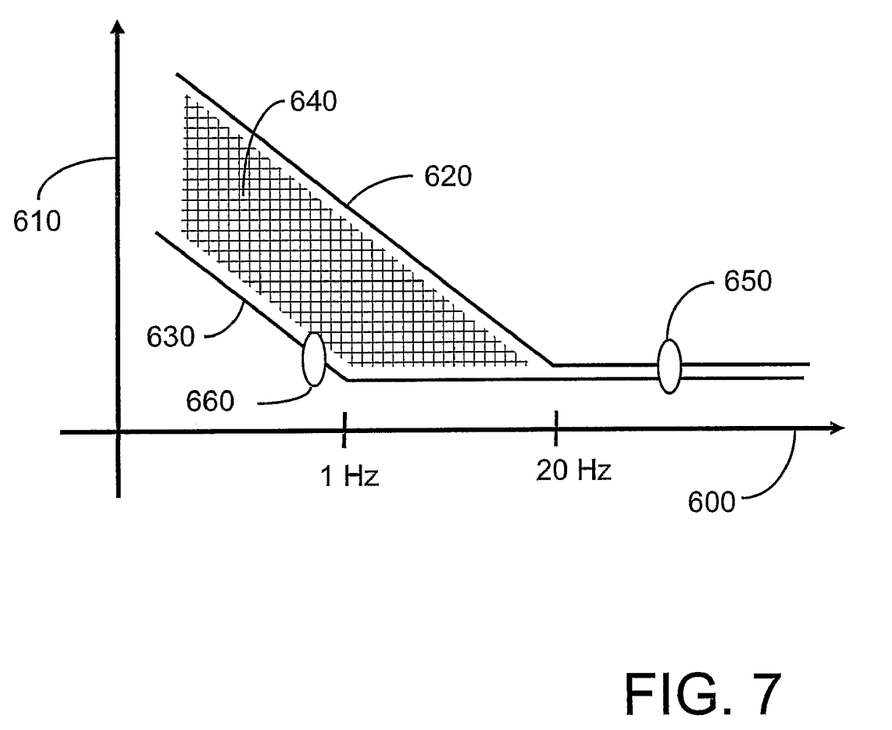
FIG. 7 is a schematic graph illustrating a noise performance improvement achievable by employing electrodes according to the present invention in the fluid flow transducer as presented in FIG. 1.

In FIG. 7, there is shown an abscissa frequency axis 600 with logarithmically increasing frequency from left to right, and an ordinate noise axis 610 representing noise in the measure M with increasing noise from bottom to top. The abscissa axis 600 represents a frequency at which the magnetic field 70 is modulated to enable the signal processing unit 90 to perform differential measurements for removing systematic offset errors as will be elucidated later. There is further shown a first curve 620 representing a measurement noise characteristic of the transducer 10 when operating with conventional graphite or corrosion-resistance metal electrodes employed for the electrodes 40a, 40b. Moreover, there is also shown a second curve 630 representing a measurement noise characteristic of the transducer 10 when operating with metal/metal halide electrodes for the electrodes 40a, 40b, these metal/metal halide electrodes as described in the aforementioned published PCT application. These metal/metal halide electrodes are capable of providing the transducer 10 with reduced low frequency measurement noise, thereby providing a noise performance improvement as represented by a region 640. Metal/metal halide electrodes including an electrically conductive porous element pursuant to the present invention when utilized for the electrodes 40a, 40b in the transducer 10 are capable of providing the transducer 10 with a measurement noise performance substantially as represented by the curve 630 which is sustained over potentially many years of continuous operation of the transducer 10. Such sustained noise improvement is of considerable benefit in that the transducer 10, to meet a given noise performance as dictated by standards authorities, is capable of operating with less frequent modulation of the magnetic field 70 and thereby conserving operating power. Such lower power operation provides the transducer 10 with considerable benefit in that it can be operated for extensive periods from a local source of power, for example a battery local thereto, and is therefore convenient to install in domestic and industrial environments on account of not needing to be connected to an external source of power, for example alternating mains electricity supply. Use of a battery local to the transducer 10 not only simplifies installation of the transducer 10 but also improves its safety especially when used for measuring water flow.

The aforementioned differential measurement performed in the signal processing unit 90 of the transducer 10 will now be further elucidated in overview. The potential V as measured between the electrodes 4oa, 40b as depicted in FIG. 1 is related to a magnitude of the flow of fluid 120 substantially according to Equation 1 (Eq. 1):

$$V=kFB+V_o+V_n \qquad \text{Eq. 1}$$

wherein

V=a voltage generated between the electrodes 40a, 40b
k=a scaling coefficient
F=a rate of fluid flow
$V_o$=an electrode systematic offset voltage
B=a magnetic field strength
$V_n$=measurement noise.

By implementing a differential measurement at two different magnitudes of the magnetic field 70, namely at magnetic field magnitudes of $B_1$ and $B_2$, a differential measurement of the voltage V is thereby derived in the signal processing unit 90 as described by Equation 2 (Eq. 2):

$$\Delta V=kF(B_2-B_1)+2V_n \qquad \text{Eq. 2}$$

to a first approximation. The measurement noise is not reduced by such a differential measurement on account of the noise being temporally uncorrelated for the two mutually different magnetic field magnitudes $B_1$, $B_2$. In a special situation wherein the magnetic field magnitudes are mutually identical but of mutually different directions, namely $B_2=-B_1$, Equation 2 can be reformulated to Equation 3 (Eq. 3)

$$\Delta V=2kFB_2+2V_n \qquad \text{Eq. 3}$$

On account of the noise $V_n$ being relatively lower in the measure M when metal/metal halide electrodes including electrically conducting porous elements according to the present invention are employed for the electrodes 40a, 40b in the transducer 10, the magnetic field 70 can be modulated less frequently, for example as denoted by 660, thereby rendering the transducer 10 capable of operating with lower power consumption; whereas conventional flow meters utilizing the transducer 10 as depicted in FIG. 1 utilizing corrosion-resistant metal electrodes or graphite electrodes operating with magnetic field modulation frequencies for differential measurement in the order of 50 Hz as denoted by 650, the transducer 10 operating with electrodes including porous elements according to the present invention is capable of operating with magnetic field modulation frequencies for differential measurement in the order of 1 Hz or less. There is therefore potentially thereby available nearly two orders of magnitude saving in operating power for the transducer 10 when operated according to the present invention in comparison to known approaches for operating the transducer 10 employing conventional types of electrodes 40a, 40b.

It will be appreciated that the transducer 10 in FIG. 1 provided with metal/metal halide electrodes including electrically conducting porous elements according to the present invention is capable of operating as a fluid flow sensor, for example a water flow sensor. When such a water flow sensor is provided with the signal processing unit 90 with a function to temporally integrate measured flow rate, the water flow sensor provided with such functionality is capable of performing as a solid-state water meter. On account of such a solid-state water meter including electrodes according to the present invention provided with at least partially electrically conductive porous elements providing the meter with lower noise, the water meter is capable of meeting noise measurement requirements whilst operating for extensive periods with a power source local thereto, for example a battery. Such a solid-state water meter represents a potentially technically advanced product in comparison to known contemporary solid-state water meters.

It will be further appreciated that the magnetic field generating component 50 can be implemented in several alternative ways. As elucidated in the aforesaid published PCT application, the field generating component 50 can employ a remnant field characteristic so that energy is only expended in altering the magnetic field 70 and not when sustaining the magnetic field 70 in a given state. Alternatively, modulation of the magnetic field 70 can be achieved by modulating magnetic reluctance of a magnetic circuit comprising the field generating component 50, the pole pieces 60a, 60b and a region of the tube 20 in which the magnetic field is established. For example, the field generating component 50 can be implemented as a permanent magnetic which is spatially moved relative to the pole pieces 60a, 60b to modulate the magnetic field 70. Such alternative approaches to modulating the magnetic field 70 of the transducer 10 for purposes of differential measurement for removing systematic offsets within the transducer 10, when the transducer 10 is implemented with its electrodes 40a, 40b according to the present invention by inclusion of at least partially electrically conductive porous elements in combination with metal/metal halide elements, is also within the scope of the present invention, for example when the transducer 10 is arranged to function as a water flow meter.

The signal processing unit 90 of the transducer 10 is capable of being implemented either using computing hardware, application-specific hardware or a mixture of such implementations. The hardware is optionally implemented in complementary metal oxide semiconductor (CMOS) technology so as to provide the transducer 10 with a relatively low power consumption, thereby enabling the processing unit 90 to function for many years from a local source of power, for example a battery local thereto. Optionally, the unit 90 is implemented as a custom application specific integrated circuit (ASIC) operable to provide a cumulative measure of the flow F of the fluid 120 through the tube 20 so as to enable the transducer 10 to function as a flow meter, for example a water flow meter.

Modifications to embodiments of the invention described in the foregoing are possible without departing from the scope of the invention as defined by the accompanying claims. For example, although embodiments are described in the foregoing in relation to measuring flow rates of fluids such as water, the present invention is capable of being adapted to measure flow rates of ionized gases and similar, for example from combustion systems. Moreover, electrodes described in the foregoing are susceptible to being used in a potentially wide range of applications in which reliable electrical contact to a fluid is required of an extensive period of time.

Expressions such as "including", "comprising", "incorporating", "consisting of", "have", "is" used to described and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A fluid flow sensor for sensing a flow of a fluid through a region, the sensor comprising a magnetic circuit for applying a magnetic field to at least a part of the region, and a configuration of electrodes for sensing a potential generated in operation between the electrodes in response to the fluid flowing through the magnetic field wherein each of the electrodes is formed by a succession of a metal element, a metal halide element, and an at least partially electrically conductive porous element located in contact with said metal halide element and, in use, with said fluid, said porous element being operable to at least partially hinder progressive loss of the metal halide element to the flow of the fluid and to provide an electrically conductive path between the flow of the fluid and the metal halide element and thereby to the metal element; wherein said porous element is less electro-chemically active than the metal employed for the metal element.

2. A sensor as claimed in claim 1, wherein the metal element includes silver and the metal halide element includes silver chloride.

3. A sensor as claimed in claim 1, wherein the porous element includes at least one of: a metal wool, a metal foam, an at least partially electrically conductive porous polymer, at least partially electrically conductive porous graphite.

4. A sensor as claimed in claim 1, wherein the porous element exhibits in operation a coefficient of electrical resistivity substantially at least an order of magnitude lower than that of the metal halide element.

5. A sensor as claimed in claim 1, wherein the porous element exhibits in operation progressive dissolution or abrasion thereof into the flow of the fluid, thereby assisting to render pores of the porous element providing porosity thereto accessible to the fluid.

6. A sensor as claimed in claim 1, wherein the porous element and the metal halide element are substantially spatially coincident.

7. A sensor as claimed in claim 1, wherein the metal halide element is at least partially incorporated into the porous element.

8. A sensor as claimed in claim 1, wherein the porous element includes, or is pre-treated with, a wetting agent for rendering the porous element hydrophilic in respect of the fluid.

9. A sensor as claimed in claim 1, wherein the metal element, the metal halide element and the porous element are substantially mutually concentrically assembled together to form each corresponding electrode.

10. A sensor as claimed in claim 1, wherein the metal element, the metal halide element and the porous element are implemented as elongate components, thereby rendering each electrode substantially linear in shape.

11. A sensor as claimed in claim 1, wherein at least one of the metal halide element and the porous element are fabricated from particles bonded together so as to impart thereto porosity in respect of the fluid.

12. A sensor as claimed in claim 10, wherein the particles are mutually bonded together by at least one of: sintering, bonding by mechanical compression, bonding by way of an added bonding agent.

13. A sensor as claimed in claim 1, wherein the metal element is spatially disposed to at least partially enclose the porous element.

14. A sensor as claimed in claim 1, wherein the porous element is arranged to at least partially enclose the metal element.

15. A sensor as claimed in claim 1, wherein the porous element is subjected during its manufacture to deposition of metal halide therein by way of anodic deposition.

16. A sensor as claimed in claim 15, wherein the anodic deposition involves a deposition of metal halide into the porous element by way of a treatment employing a salt including a metal present in the metal element, and by way of a treatment employing an acid including a halide present in the metal halide element.

17. A sensor as claimed in claim 16, wherein the salt includes silver nitrate and the acid includes hydrochloric acid.

18. A sensor as claimed in claim 1 including a signal processing unit for receiving from the configuration of electrodes a signal corresponding to the potential generated between the electrodes in operation, the signal processing unit being operable to process the signal to generate at least one of a measure of the flow of the fluid, and a cumulative measure of the flow of the fluid, the sensor in combination with the signal processing unit thereby providing a fluid flow meter.

19. An electrode for providing an electrical contact to a fluid, the electrode comprising a metal element wherein the electrode is formed by a succession of mental element, a metal halide element and an at least partially electrically conductive porous element located in contact with said mental halide element, in use, with said fluid; said porous element being operable to at least partially hinder progressive loss of the metal halide element to the fluid, and to provide an electrically conductive path between the fluid and the metal halide element and thereby to the metal element; wherein said porous element is less electro-chemically active than the metal employed for the metal element.

20. An electrode as claimed in claim 19, wherein the metal element includes silver, and the metal halide element includes silver chloride.

21. An electrode as claimed in claim 19, wherein the porous element includes at least one of: a metal wool, a metal foam, an at least partially electrically conductive porous polymer, at least partially electrically conductive porous graphite.

22. An electrode as claimed in claim 19, wherein the porous element exhibits in operation a coefficient of electrical resistivity substantially at least an order of magnitude lower than that of the metal halide element.

23. An electrode as claimed in claim 19, wherein the porous element exhibits in operation progressive dissolution or abrasion thereof into the fluid, thereby assisting to render pores of the porous element providing porosity thereto accessible to the fluid.

24. An electrode as claimed in claim 19, wherein the porous element and the metal halide element are substantially spatially coincident.

25. An electrode as claimed in claim 19, wherein the porous element includes, or is pre-treated with, a wetting agent for rendering the porous element hydrophilic in respect of the fluid.

26. An electrode as claimed in claim 19, wherein the metal element, the metal halide element and the porous element are substantially mutually concentrically assembled together to form the electrode.

27. An electrode as claimed in claim 19, wherein the metal element, the metal halide element and the porous element are implemented as elongate components, thereby rendering the electrode substantially linear in shape.

28. An electrode as claimed in claim 19, wherein at least one of the metal halide element and the porous element are fabricated from particles bonded together so as to impart thereto porosity in respect of the fluid.

29. An electrode as claimed in claim 28, wherein the particles are mutually bonded together by at least one of: sintering, bonding by mechanical compression, bonding by way of an added bonding agent.

30. An electrode as claimed in claim 19, wherein the metal element is spatially disposed to at least partially enclose the porous element.

31. An electrode as claimed in claim 19, wherein the porous element is arranged to at least partially enclose the metal element.

32. An electrode as claimed in claim 19, wherein the porous element is subjected during its manufacture to deposition of metal halide therein by way of anodic deposition.

33. An electrode as claimed in claim 32, wherein the anodic deposition involves a deposition of metal halide into the porous element by way of treatment with a salt including a metal present in the metal element, and of treatment with an acid including a halide present in the metal halide element.

34. An electrode as claimed in claim 33, wherein the salt includes silver nitrate and the acid includes hydrochloric acid.

35. A sensor as claimed in claim 1, wherein the porous element is subjected during its manufactured to deposition of metal halide therein by way of electroplating.

36. An electrode as claimed in claim 19, wherein the porous element is subjected during its manufacture to deposition of metal halide therein by way of electroplating.

37. A sensor as claimed in claim 1, wherein said porous element incorporates pores which retain metal halide.

38. An electrode as claimed in claim 19, wherein said porous element incorporates pores which retain metal halide.

* * * * *